C. H. TAYLOR & B. B. NEUTEBOOM.
OIL DISTRIBUTING DEVICE.
APPLICATION FILED MAY 11, 1914.
1,209,230.  Patented Dec. 19, 1916.
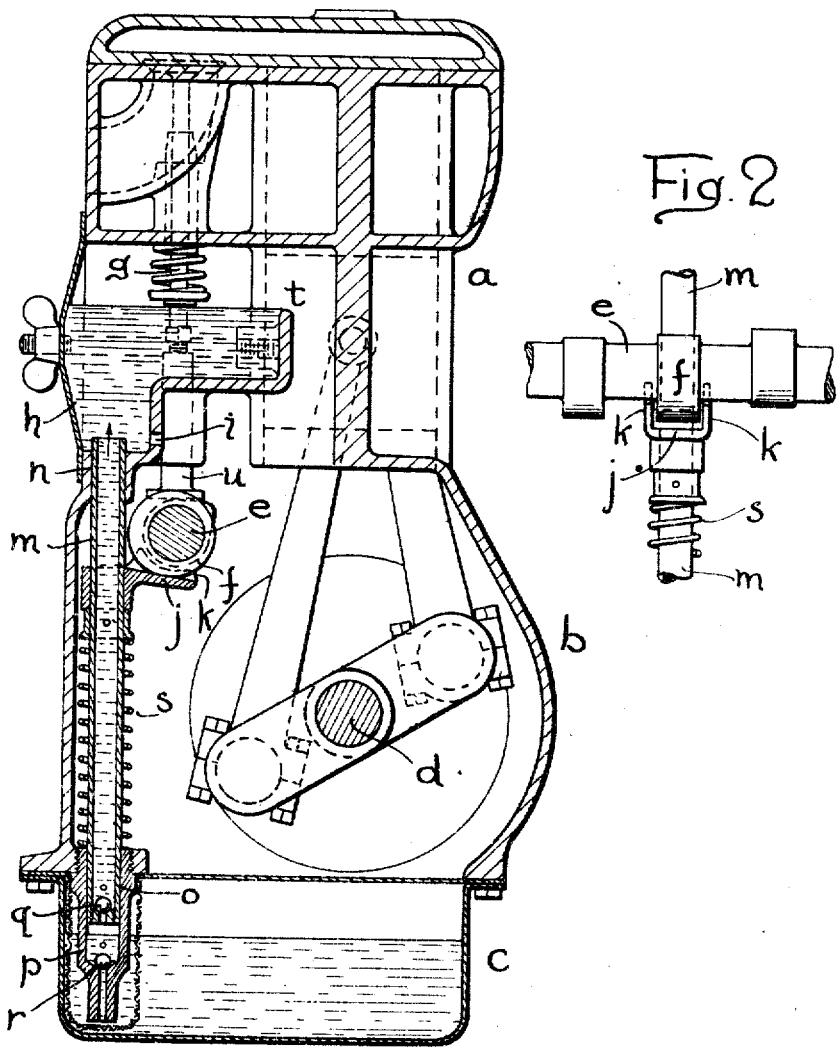
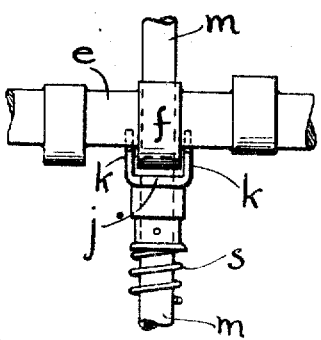

UNITED STATES PATENT OFFICE.

CECIL HAMELIN TAYLOR AND BOUDEWIJN B. NEUTEBOOM, OF DETROIT, MICHIGAN.

OIL-DISTRIBUTING DEVICE.

1,209,230.  Specification of Letters Patent.  Patented Dec. 19, 1916.

Application filed May 11, 1914. Serial No. 837,620.

*To all whom it may concern:*

Be it known that we, CECIL HAMELIN TAYLOR, citizen of the United States, residing at Detroit, county of Wayne, State of Michigan, and BOUDEWIJN B. NEUTEBOOM, subject of the Queen of Holland, residing at Detroit, county of Wayne, State of Michigan, have invented a certain new and useful Improvement in Oil-Distributing Devices, and declare the following to be a full, clear, and exact description of the same, such as will enable others skilled in the art to which it pertains to make and use the same, reference being had to the accompanying drawings, which form a part of this specification.

Our invention relates to an oil distributing device and a special object of our improvements is to provide means for distributing the oil in an internal combustion engine which shall occupy little space and which shall be efficient in that the actuation of the oil shall be approximately at a uniform rate and proportional to the speed of the engine. We attain this object in the device illustrated in the accompanying drawings in which, Figure 1, is a vertical section of an engine having an apparatus embodying our invention attached thereto. Fig. 2, is a detail elevation showing the construction of some of the parts.

$a$ is the cylinder and $b$ the crank case and $c$ is a trough or receptacle at the bottom of the crank case adapted to receive and contain oil.

$d$ is the main shaft of the engine and $e$ is the cam shaft. The shafts $d$ and $e$, it will be understood, are connected in the usual way, so that angular motion is communicated from the shaft $d$ to the shaft $e$.

$g$ is a valve stem and $h$ is an oil reservoir located at the upper end of the crank case and adjacent to the lower end of the cylinder. The valve stem $g$ extends at its lower end into the reservoir $h$ and below the level of the oil therein.

$u$ is a push rod extending through the lower wall of the reservoir $h$ and adapted to actuate the stem $g$.

$t$ is an overflow dam which determines the level of the oil in the reservoir $h$.

$i$ is an aperture extending from the reservoir $h$ below the level of the oil therein and opening into a bearing in which the push rod $u$ reciprocates. Oil is supplied through the aperture $i$ to lubricate the rod $u$.

$m$ is a tube opening at its upper end to the reservoir $h$ and at its lower end into a socket $p$. The tube $m$ is adapted to fit and reciprocate longitudinally in a bearing $n$ in the lower wall of the reservoir $h$ and in a bearing $o$ in the socket $p$. The socket $p$ opens at its lower end below the level of the oil in the trough $c$.

$r$ is a ball valve in the socket $p$ opening inward.

$q$ is a ball valve at the lower end of the tube $m$ adapted to open toward the inside of said tube.

$j$ is a shoe, or cam piece, sleeved and secured upon the tube $n$.

$f$ is a cam upon the shaft $e$ bearing against the upper surface of the shoe $j$. The shoe $j$ is provided with flanges $k$ $k$ (Fig. 2) shrouding the cam $f$ and thus preventing the rotation of the tube $m$ in its bearings.

$s$ is a spring acting to force the tube $m$ toward the upper limit of its travel.

The operation of the above described device is as follows: When the engine is in motion the tube $m$ is reciprocated longitudinally thereof in its bearings by the cam $f$ and spring $s$. The lower end of the tube $m$ acts in the socket $p$ as the plunger of a pump thus drawing and forcing oil from the trough $c$ past the valves $r$ and $q$. The oil passes up through the bore of the tube $m$ and fills the reservoir $h$ running over the dam $t$. When the tube $m$ is full of liquid, the inertia of such liquid assists the pumping action of the apparatus when the tube is forced downward and thus secures a greater volumetric efficiency and certainty of action.

What we claim is:

1. In an internal combustion engine, a crank case, a trough at the lower portion of said crank case, an elevated reservoir, a tube forming a conduit between said trough and reservoir, and located in said crank case, a cam shaft, a cam on said shaft and means whereby said cam shall act to reciprocate said tube and means whereby the reciprocation of said tube shall cause a fluid to flow therethrough.

2. In an internal combustion engine, a crank case, a trough at the lower portion of said crank case, an elevated reservoir, a tube forming a conduit between said trough and reservoir, and located in said crank case, a cam shaft, a cam on said shaft, a shoe projecting from said tube to a position to be acted on by said cam to reciprocate said tube, and means whereby the reciprocation of said tube shall cause a fluid to flow therethrough.

3. In an internal combustion engine, a crank case, a trough at the lower portion of said crank case, an elevated reservoir, a tube located in said crank case and opening at one end to said trough and at the other end to said reservoir, means for reciprocating said tube, and means whereby the reciprocation of said tube shall cause a fluid to flow therethrough.

In testimony whereof, we sign this specification in the presence of two witnesses.

CECIL HAMELIN TAYLOR.
BOUDEWIJN B. NEUTEBOOM.

Witnesses:
AGNES M. HIPKINS,
ELLIOTT J. STODDARD.